United States Patent [19]
Andrieux et al.

[11] Patent Number: 4,967,111
[45] Date of Patent: Oct. 30, 1990

[54] SYSTEM FOR AXIALLY LOCATING THE ROTOR OF A ROTATING MACHINE

[75] Inventors: Raymond Andrieux, Meudon; Pierre Hom, Maurepas; Patrick Laseneur, Courbevoie, all of France

[73] Assignee: Valeo, Paris, France

[21] Appl. No.: 296,004

[22] Filed: Jan. 12, 1989

[30] Foreign Application Priority Data

Jan. 14, 1988 [FR] France ............... 88 00356

[51] Int. Cl.$^5$ .......................... H02K 5/16
[52] U.S. Cl. ......................... 310/90; 310/42; 310/43; 310/261; 29/598; 384/295; 403/268
[58] Field of Search ............ 310/90, 51, 42, 43, 310/45, 261, 265; 29/598; 384/275, 292, 299, 300, 295, 537, 584; 403/266–268; 464/181, 182, 183

[56] References Cited

U.S. PATENT DOCUMENTS

| | | | |
|---|---|---|---|
| 3,483,409 | 12/1969 | Phillips | 310/51 |
| 4,164,674 | 8/1979 | Buckman | 310/90 |
| 4,170,058 | 10/1979 | Leffler | 310/90 |
| 4,653,953 | 3/1987 | Anderson | 403/268 |
| 4,663,498 | 5/1987 | Rye | 403/268 |
| 4,776,082 | 10/1988 | Janzer | 310/42 |

FOREIGN PATENT DOCUMENTS

| | | |
|---|---|---|
| 0065585 | 12/1982 | European Pat. Off. . |
| 0213427 | 3/1987 | European Pat. Off. . |
| 1538921 | 8/1969 | Fed. Rep. of Germany . |

*Primary Examiner*—R. Skudy
*Attorney, Agent, or Firm*—Dennison, Meserole, Pollack & Scheiner

[57] ABSTRACT

The invention provides a system for axially keying and adjusting in position on a shaft the stator of a rotating machine such as an electric motor. The shaft is mounted on bearings at either end and an insulating disc is disposed between one of the bearings and the stator. The insulating disc comprises a recess, the median plane of which is substantially orthogonal to the shaft and a communicating channel formed between this recess and an annular space between a sleeve of the insulating disc. A settable bonding material is introduced into this space and a spacing bush is fitted over the shaft between the insulating disc and the adjacent bearing which passes into the annular recess and acts as a piston when the parts are assembled to drive the bonding material into the recess and take up any free play. The assembly is bonded together when the material sets.

6 Claims, 2 Drawing Sheets

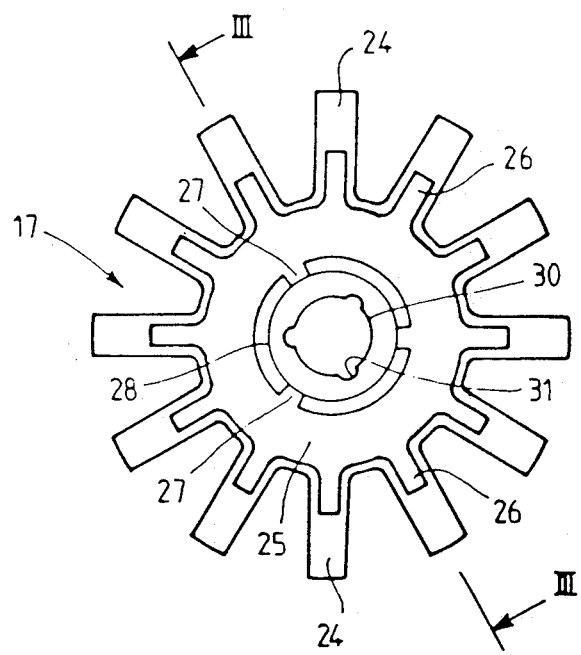
FIG. 2
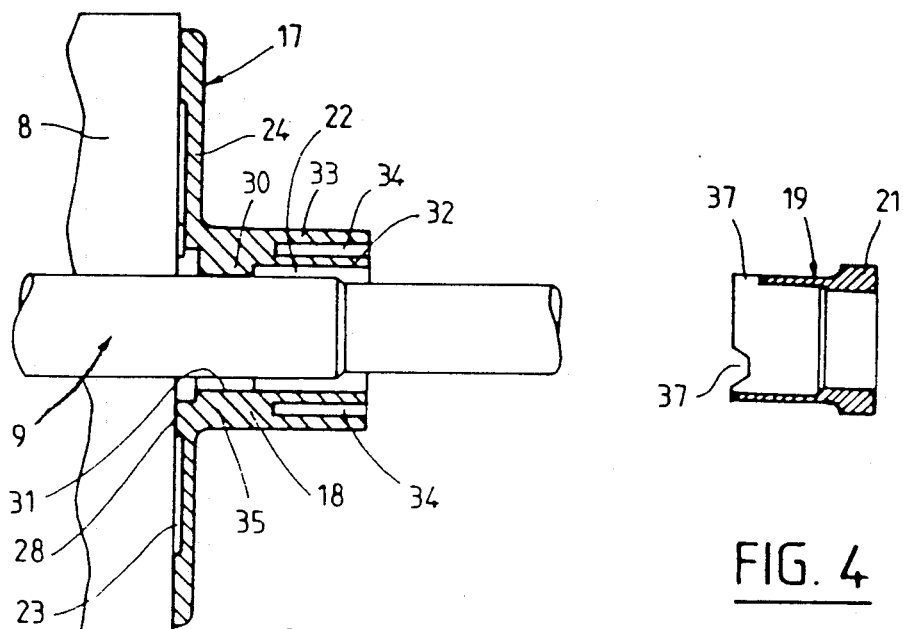
FIG. 3
FIG. 4

SYSTEM FOR AXIALLY LOCATING THE ROTOR OF A ROTATING MACHINE

FIELD OF THE INVENTION

The invention relates to means for axially keying in position the rotor of a rotating machine such as an electric motor, this rotor being mounted on a shaft which bears near one end, on a first bearing mounted in the stator of the rotating machine, and near its other end, on a second bearing likewise mounted in the stator, means for controlling axial clearance being provided between the second bearing and an insulating disc applied against the adjacent surface of the rotor, this disc comprising a sleeve which is coaxial with the rotor and which projects towards the second bearing, the said means for controlling axial clearance comprising a spacing bush adapted to bear against the second bearing and to engage in the sleeve of the insulating disc.

This keying diminishes operating noises since an uncontrolled clearance allows reciprocation of the rotor relative to the stator with a succession of shocks against the bearings.

BACKGROUND OF THE INVENTION

A keying device of this kind is disclosed, for example, in European Patent EP-A-0 065 585.

In this arrangement, the spacing bush constitutes a friction element adapted to rotate with the shaft and the rotor of the motor. In order for this to occur, the bush is clamp fitted on the shaft and the sleeve connected to the rotor. However, the spacing bush must still be able to slide axially on the shaft to enable keying and adjustment of the axial clearance during assembly of the motor. The need to permit axial sliding of the spacing bush may lead to a mounting which is inadequately clamped to provide sufficient connection in rotation and in translation between the spacing bush, on the one hand, and the shaft and rotor of the motor, on the other hand.

Conversely, clamped mounting of the bush to ensure connection in rotation may make axial sliding difficult.

To provide efficient connection between the spacing bush and the rotor, as well as with the shaft, use of a filling material, which can be hardened, disposed between the bush and the rotor has been proposed (see German patent No. DE-A-1 538 921). However, supplying the correct quantity of material to be inserted is difficult, since the axial clearance to be taken up is not known exactly, so that the effectiveness of the connection which is made with the material which can subsequently be hardened is not always optimal.

The primary object of the invention is to provide a device for axially keying the rotor of a rotating machine of the kind defined previously, which responds better than those currently available to the various requirements in practice and which, in particular, enables better use of the material bonding the shaft, the sleeve of the insulating disc and the spacing bush.

SUMMARY OF THE INVENTION

According to the invention, a device for axially keying the rotor of a rotating machine as previously defined, is characterized in that the insulating disc of the rotor comprises at least one recess the median plane of which is substantially orthogonal to the shaft of the rotor, and a communicating channel between this recess and an annular space which is present between the internal surface of the sleeve and the external surface of the shaft of the rotor, the assembly being such that as the time of keying, a liquid, which can subsequently be hardened, can be introduced into the said annular space then, when the spacing bush is engaged in the sleeve and therefore in said annular space, this bush acts as a piston and drives the excess liquid back into the aforementioned recess, the liquid after hardening providing a bonding between the various parts.

The invention will be described in more detail hereinafter in relation to a specific embodiment, which is in no way limiting, with reference to the attached drawings.

BRIEF DESCRIPTION OF THE DRAWINGS

FIG. 2 is a view along the line II—II of the insulating disc apPlied against a face of the rotor;

FIG. 3 is a section along the line III—III in FIG. 2; and

FIG. 4 is an axial section of the spacing bush.

DESCRIPTION OF THE PREFERRED EMBODIMENT

Figure 1:
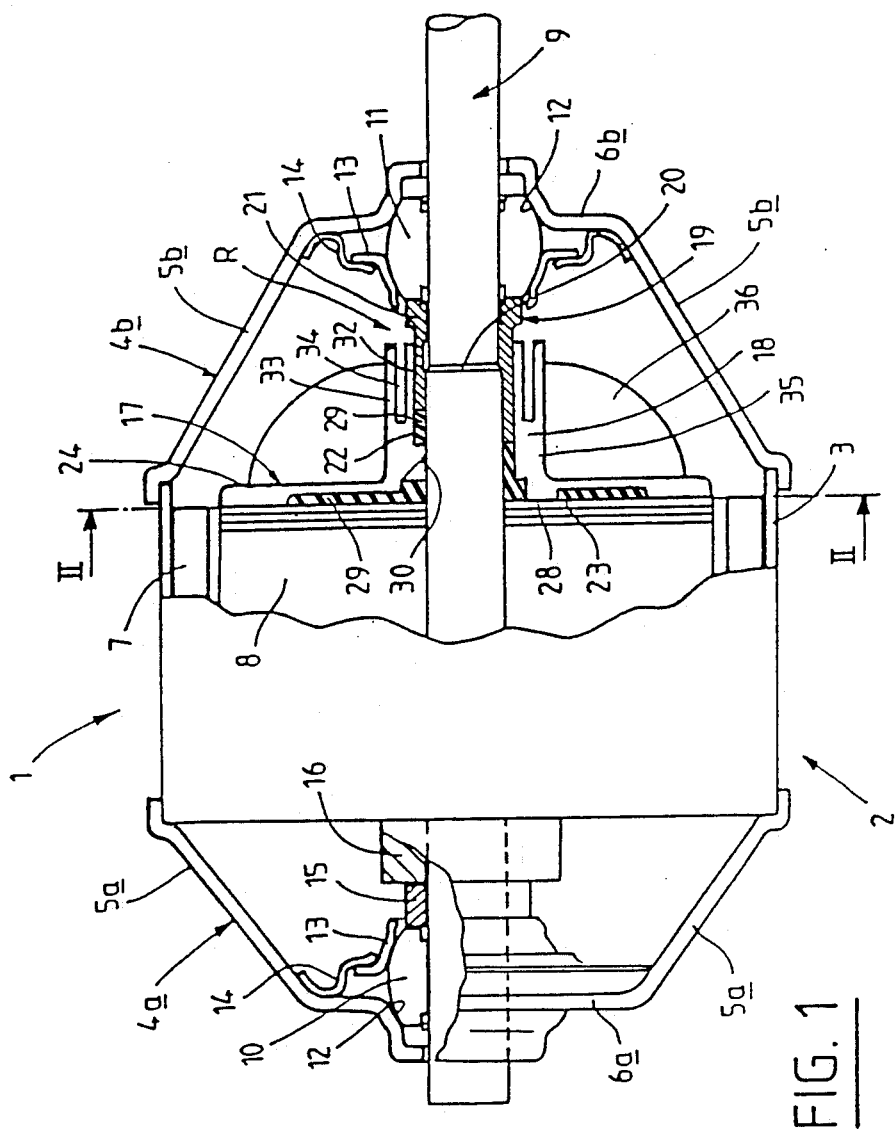
FIG. 1 is a longitudinal view, partly in section, of an electric motor the rotor of which is immobilized axially by means in accordance with the invention.

FIG. 1 shows an electric motor 1, the stator 2 of which is made from pieces of sheet metal. This stator comprises a central cylinder body 3 made by bending sheet metal.

Extensions 4a, 4b, are provided at each end of the body 3; each extension 4a, 4b, made by pressing from sheet comprises two diametrically opposite sections 5a, 5b, sloping relative to the direction of the axis of the body 3. The ends of the sections 5a, 5b are fixed to the edge of the wall of the body 3. At the other ends the sections 5a, 5b are connected to a flange 6a, 6b the median plane of which is orthogonal to the axis of the body 3.

On the internal surface of the body 3 are disposed permanent magnets 7, especially constituted by ferrites. A reinforcing ring, not shown in the drawing, may be provided around the body 3.

A rotor 8 mounted on a shaft 9 is disposed inside the stator. This shaft bears towards one end on a first rockable bearing 10 mounted in the stator 2, the said shaft 9 bearing towards its other end on a second rockable bearing 11 likewise mounted in the stator 2.

At least one of the rockable bearings 10, 11 is force fitted on the shaft 9.

More specifically, the spherical surface of the bearing 10 is received spherical cupping 12 region, constituted by a pressing made in the flange 6a, projecting away from the rotor 8. On the other side, the bearing 10 is capped by an open cup 13 held by a spring 14 adapted to apply the said bearing elastically against the cup 12.

A friction ring 15 is disposed axially around the shaft 9 between the bearing 10 and a commutator 16 connected in rotation and translation to the shaft 9. This shaft, and therefore the rotor 8 fixed on the shaft 9, are in axial abutment against the first bearing 10.

The second bearing 11 is mounted in the flange 6b in the same way as the bearing 10 in the flange 6a. The same reference numbers have been used to refer to the parts or elements serving to mount the bearing 11.

Because of manufacturing tolerances, especially in relation to a stator 2 made from sheet metal elements, especially pressed out, it will be understood that there is considerable variation in the axial distance between the two flanges 6a, 6b and more specifically between the spherical regions 12 forming cups provided in the two flanges. There is likewise variation in the dimensions of the rotor and commutator assembly in the axial direction.

To compensate for these differences, means R for controlling the axial clearance are provided between the second bearing 11 and an insulating disc 17 applied and fastened against the adjacent face of the rotor 8. The disc 17 comprises a sleeve 18 coaxial with the shaft 9 of the rotor and projecting towards the second bearing 11. The means R for controlling the axial clearance comprise a spacing bush 19 adapted to bear against the second bearing 11, and more precisely against the end of the second bearing and, on the opposite side to the bearing 11, to engage in the sleeve 18.

The part of the shaft 9 situated in the rotor 8 and in the sleeve 18 has a larger diameter than that part of the shaft passing through the bearing 11, so that a shoulder 20 is formed in the region where there is a change in diameter. This shoulder 20 is situated inside the sleeve 18 towards the open end of the sleeve. The bush 19 comprises at the end towards the bearing 11, a thicker part 21 the internal diameter of which bears on the part of shaft 9 having a reduced section. A sufficient distance is provided between the shoulder 20 and the part 21 to enable compensation of the axial clearance in all cases. The end of the bush 19 away from the part 21 is engaged in the annular space 22 comprised between the internal surface of the sleeve 18 and the external surface of the shaft 9.

The respective sizes of the various parts are chosen in such a way that the bush 19 is engaged with slight friction in the sleeve 18 without excessive force. The same applies to the mounting of the bush 19 on the shaft 9.

The insulating disc 17 comprises at least one recess 23 (see in particular FIGS. 2 and 3) the median plane of which is substantially orthogonal to the shaft 9 of the rotor. In the embodiment shown, the disc 17 comprises a central part equipped with radial extensions 24 on its periphery, giving the assembly a star-like appearance. The recess 23 comprises a central crown 25 having projections at its periphery provided by radial prolongations 26 in the extensions 24.

The recess 23 and its prolongations 26 are open towards the adjacent face of the rotor 8 and bear against this face.

Communicating channels 27, of which there are three in the embodiment considered, are provided between the recess 23 and the annular space 22. These channels 27 are regularly spaced angularly in a circular flange 28 which limits the recess 23 radially on the inside, and which comes to bear against the adjacent transverse face of the rotor.

The assembly is such that at the time of keying, a liquid 29 which sets, such as by polymerization, can be introduced into the annular space 22. Then, when the spacing bush 19 is engaged in the annular space 22, this bush acts as a piston and its movement drives or forces the excess liquid into the recess 23 through the communicating channels 27.

The internal wall of the sleeve 18 may comprise a cylindrical bearing 30 adapted to bear on the shaft 9 of the rotor. As shown in FIG. 2, this bearing 30 comprises three equally spaced longitudinal grooves 31 adapted to connect the regions of the annular space 22 (FIG. 1) situated axially on both sides of the bearing 30 adjacent the external surface of shaft 9.

The sleeve 18 comprises a first internal cylindrical wall 32 immediately surrounding the shaft 9 of the rotor and a second cylindrical wall 33 surrounding the first wall 32 with a defined radial gap. An annular clearance 34 separates the two walls 32 and 33 which rejoin each other towards the disc to form a single thickened section 35.

The second wall 33 absorbs the deformations during the installation of the induction winding 36 the turns of which may come to bear against the wall 33. This arrangement enables the wall 32 to be correctly adjusted on the bush 19 without fear of interfering deformations. Without the wall 33, the winding may bear directly on the wall 32 and cause its deformation.

To improve the fixing in rotation of the bush 19 with the rotor, a plurality of notches such as 37 (FIG. 4) are regularly distributed on the periphery of the end of the bush which is inserted first in the sleeve 18. These notches 37 open towards the bottom of the sleeve 18 and are ada provide anchoring in rotation of the bush 19 in the liquid 29.

The operation of assembling and axially keying the parts of the electric motor are as follows.

The assembling operations are preferably performed with the axis of the stator 2 vertical. The flange 6a with its section 5a is previously fixed on the body 3 of the stator. The other end of the body 3 remains open, the extension 4b not yet being in position.

The bearing 10 is mounted in the cup 12 of flange 6a. The rotor 8, mounted on the shaft 9, is then installed in the stator, the friction ring 15 being placed between the bearing 10 and the commutator 16. The end of the shaft 9 projects beyond the cup 12.

On the opposite side to the bearing 10, the sleeve 18 of the insulating disc 17 fixed on the rotor determines a housing formed by the annular space 22 which opens upwards because of the vertical positioning adopted for assembling.

This space 22 is then filled with a bonding liquid 29 which can be polymerized to form an elastic or rigid fixing ring. The bush 19 and the bearing 11 mounted in the flange 6b of the extension 4b are engaged on the shaft 9.

The extension 4b, and therefore the bush 19, are then pushed axially until the ends of the sections 5b arrive in their fixing positions on the body 3. These sections 5b are then fixed, for example by crimping.

During this operation the bush 19 slides into the space 22 and acts as a piston, forcing back the liquid 29 towards the recesses 23 and prolongations 26.

The liquid 29 hardens after assembly and establishes a translational connection between the bush 19 and the assembly consisting of the sleeve 18 and the disc 17. Moreover, the end surface of the part 21 of this bush 19 bears against the bearing 11, so that the axial clearance between this bearing and the assembly connected to the rotor is completely taken up whatever the variation in sizes of the various parts to be assembled, especially with regard to the stator.

It will of course be understood that the size of the communicating channels 27 should be directly related to the viscosity of the liquid so that the latter does not pass too easily behind the insulating disc 17.

The reliable and efficient suppression of the axial play reduces vibrations and operating noises. Furthermore, the solution provided by the invention eliminates excessive axial tightening of the second bearing 11, which could cause heating in operation and rapid wear of the friction elements and thus a decreased performance of the electric motor. This is made possible, in particular, because the bush 19 is mounted without excessive clamping on the shaft 9 or in the sleeve 18 so that during assembling, its axial displacement for control of the, clearance does not require production of large axial forces which would put an axial stress on the rocking bearings, producing considerable friction.

What is claimed is:

1. A system for axially keying a rotor of a rotating machine such as an electric motor, to a shaft which bears near one end on a first bearing mounted in a stator of the rotating machine and near its other end, on a second bearing likewise mounted in said stator, means for controlling axial clearance between said second bearing and said rotor comprising an insulating disc applied against an adjacent surface of said rotor, said disc having a sleeve which is coaxial with said rotor and projecting towards said second bearing and said means for controlling axial clearance including a spacing bush adapted to bear against said second bearing and to engage said sleeve of said insulating disc; wherein said disc of the rotor comprises at least one recess the median plane of which is substantially orthogonal to the shaft of said rotor, and a communicating channel between said recess and an annular space provided between the internal surface of said sleeve and the external surface of the shaft of said rotor, and means for introducing a liquid, which can subsequently be hardened, into said annular space, and when said spacing bush is engaged in said sleeve and therefore in said annular space, said bush acts as a piston to drive excess liquid back into said recess, whereby the liquid after hardening provides a bonding to key said rotor to said shaft.

2. A system according to claim 1, wherein said insulating disc comprises a central part provided at its periphery with radial extensions in which recesses are provided.

3. A systems according to claim 2 wherein the recess said of disc open towards said adjacent surface of the rotor and are applied against this surface.

4. A system according to claim 1 wherein said sleeve of said insulating disc comprises, on its internal wall, a cylindrical bearing adapted to bear on the shaft of the rotor, this cylindrical bearing comprising at least one longitudinal groove adapted to connect the regions of the annular space situated axially on either side of the bearing of the sleeve.

5. A system according to claim 1, wherein said spacing bush comprises, when engaging said sleeve of said insulating disc, at least one notch opening towards the bottom of the sleeve and anchoring of the bush by said liquid.

6. A device according to claim 1, wherein said sleeve comprises a first cylindrical wall immediately surrounding the shaft of the motor and a second cylindrical wall surrounding the first cylindrical wall with a radial gap, an annular clearance separating t walls, the latter rejoining each other towards the disc to form a single thickened section.

* * * * *